Sept. 27, 1966 H. E. MELTZER 3,275,799
HEAT SHRINKING APPARATUS
Filed Oct. 17, 1963 4 Sheets-Sheet 3

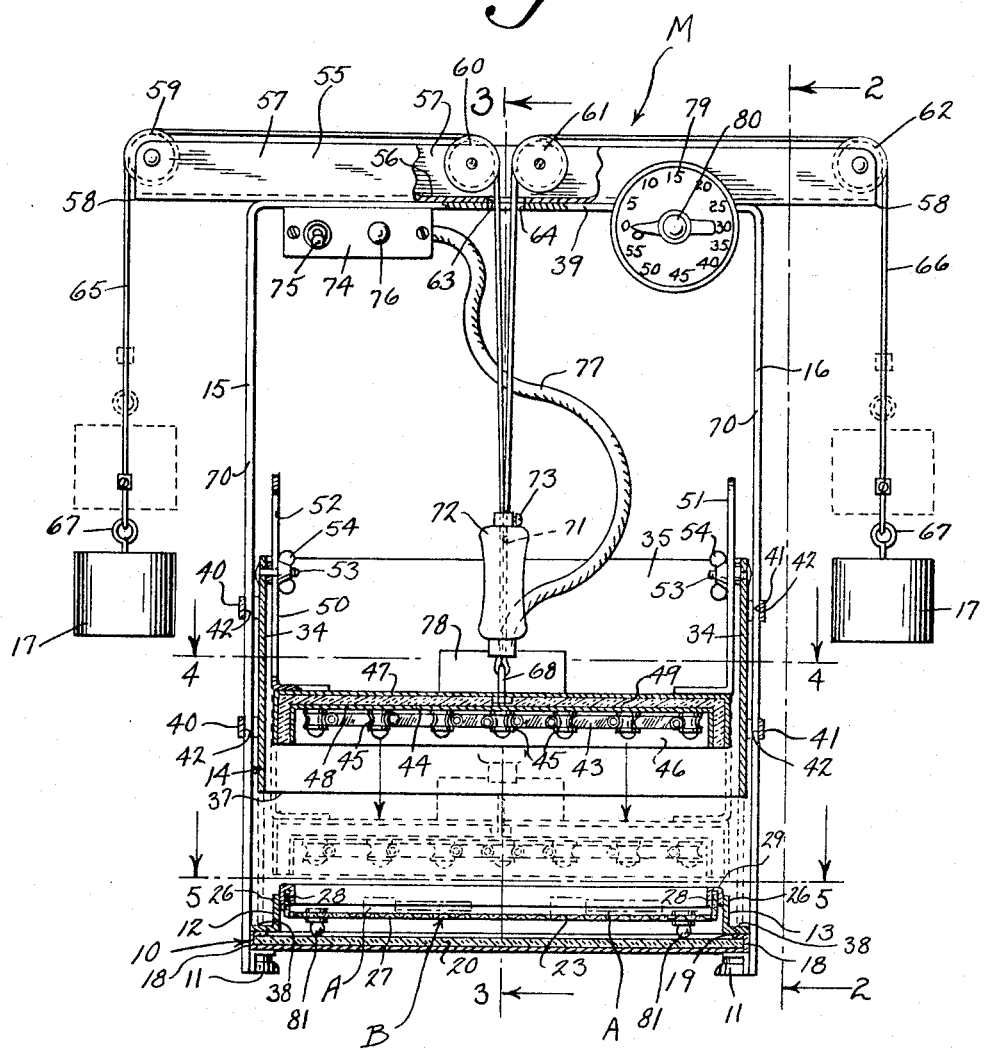

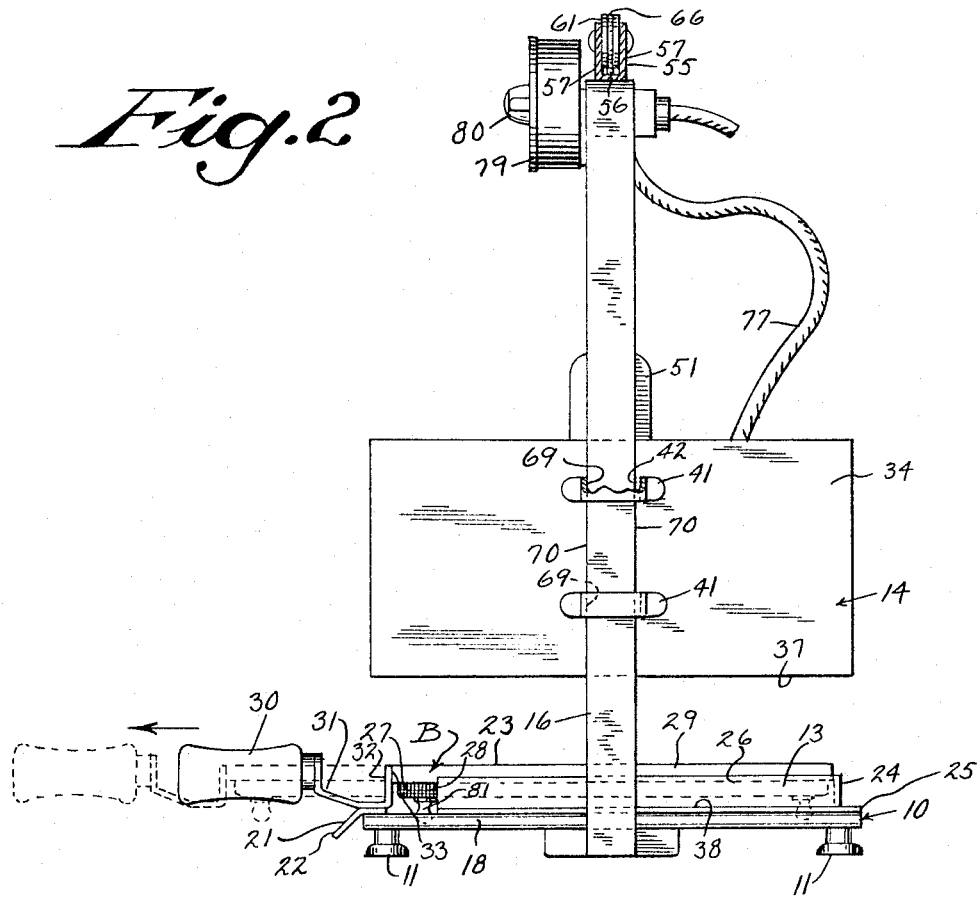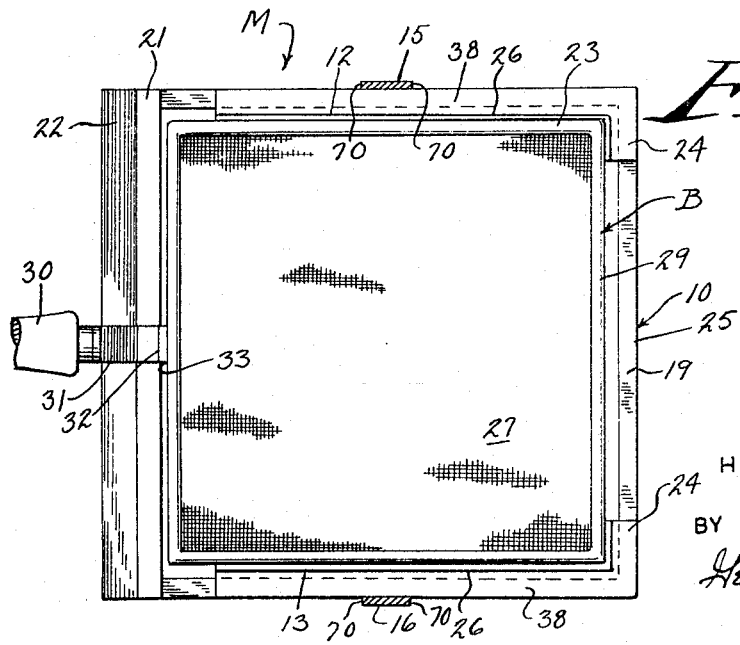

INVENTOR
HENRY E. MELTZER
BY George W. Wright, Jr.

Sept. 27, 1966   H. E. MELTZER   3,275,799
HEAT SHRINKING APPARATUS
Filed Oct. 17, 1963   4 Sheets-Sheet 4
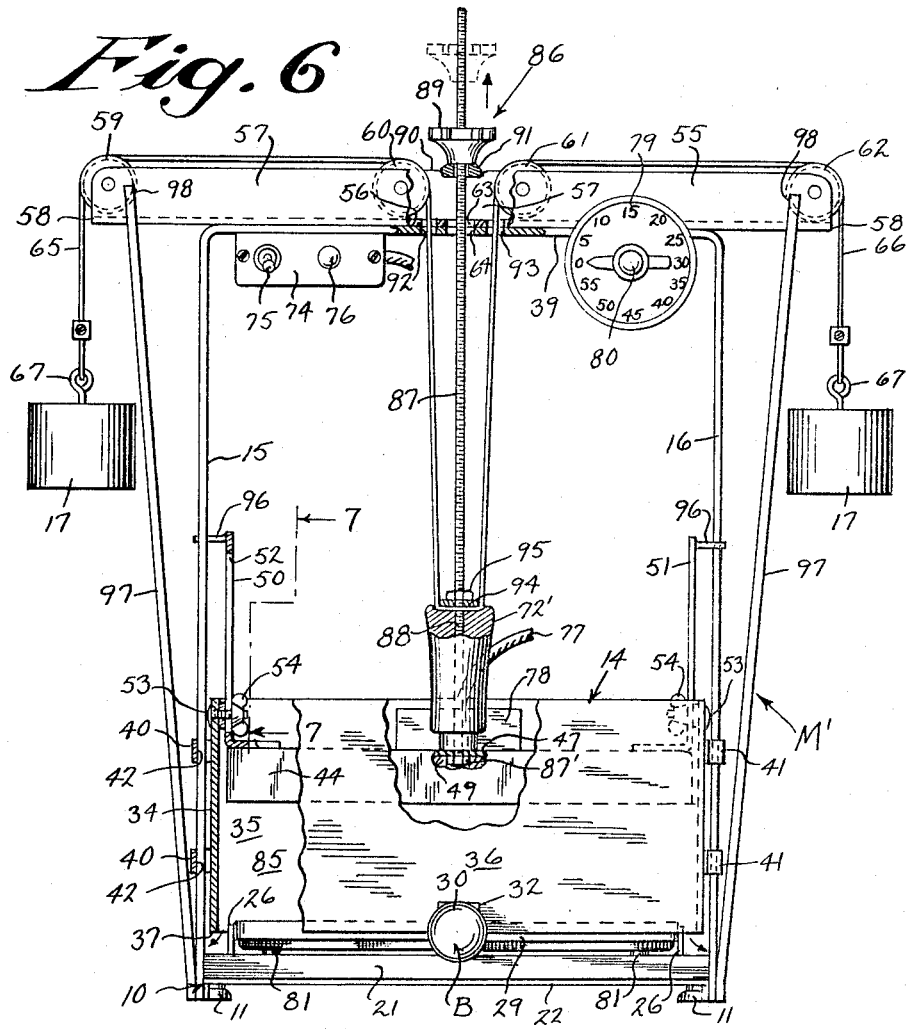
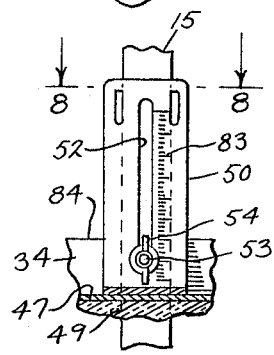
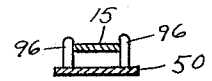
INVENTOR
HENRY E. MELTZER
BY George W. Wright

United States Patent Office 3,275,799
Patented Sept. 27, 1966

3,275,799
HEAT SHRINKING APPARATUS
Henry E. Meltzer, 1745 Fleet St., Racine, Wis.
Filed Oct. 17, 1963, Ser. No. 316,920
6 Claims. (Cl. 219—342)

This invention appertains to heat application and heat treating, and more particularly to new and useful improvements in a machine for heat shrinking material in articles for marking insulation, joining and other purposes.

In the space industry, and particularly in electrical and electronic systems for space crafts and the like, it is the practice to utilize certain types of insulation materials which respond to heat and shrink about the articles where it is desired to apply the same. The material is generally furnished in tubular shape and is slipped over the part to be insulated, joined or marked and heat applied until it is firmly shrunk and fused to the article. Heretofore, this has been done by using a heat gun blowing hot air directly on the material, and this was either done where the material was being assembled, or where actually being applied to the system. Obviously, this method is undesirable in that, only one article can be worked upon at a time, the amount of heat applied to the article is not constant, and sometimes this results in damage to other sensitive parts of the system. It is, therefore, important that just the right amount of heat be applied and that the length of time of the application be predetermined. It is also desirable to be able to treat a number of articles at once even though they may vary in size, and as aforementioned, to apply a known amount of heat for the correct length of time, thus accomplishing the shrinking of the material on the article without damaging other sensitive parts of the article.

It is, therefore, a primary object of my present invention to provide a heat shrinking machine which will effectively apply and direct the heat to a number of articles at once, and wherein the amount of heat applied can be accurately controlled and the heat quickly relieved when it is apparent that the desired amount of time of treatment has been reached.

Another object of my present invention resides in providing a novel, portable basket into which the articles to be treated are placed, with the basket being so constructed and arranged as to fit on the base of the machine where the heat can be directed to the articles.

An important object of my present invention is to provide a new and novel machine for heat shrinking material about various articles, the machine having a base for receiving the basket and articles above which is a cage carrying the heating elements, and this cage is movable to an operative position over the base and articles and to an open inoperative position away from the articles.

Still another object of my present invention, is to provide a machine wherein the cage includes side walls completely surrounding the base, tray and articles to confine the heat therein and is provided with means to adjust the height of the heating elements above the articles when the cage is in its operative position.

A further object of the invention is to provide a machine having novel means for quickly and easily moving the cage from its operative heat treating position above the articles to its inoperative position and vice versa.

A more specific object of my invention is to provide a novel machine having vertically extending spacing side rails or guides secured to the base and upon which the cage moves or slides in a vertical position toward and away from the base.

A salient feature of my invention relates to providing a machine having counterweights for the sliding cage and heating elements to facilitate the easy manipulation of the cage and wherein the points of attachment of the cables for the weights are secured off center in relation to the center of gravity of the cage, so that the cage will tilt in relation to the side rails or guides, thus causing a slight binding action to hold the cage in any adjusted position.

A further object of my present invention relates to a novel machine wherein the weight of the cage and heating elements is the same as, or very slightly greater than, the counterweights, so that the cage can be quickly and easily moved by moving the weights, or by manually manipulating the handle secured to the cage.

Another important object of my invention is to provide novel adjustable stop means which can be regulated to limit the downward movement of the cage when desired thus eliminating damage to or burning of the articles when the heat builds up too fast or accidentally exceeds the time limit.

A still further object of my invention is to provide a simple, practical and reliable construction that is economical to manufacture, easy to assemble and positive in its operation.

With the above and other objects in view which will more readily appear as the nature of the invention is better understood, the same consists in the novel construction, combination and arrangement of parts hereinafter more fully described, illustrated and claimed.

Several preferred and practical embodiments of my invention are shown in the accompanying drawings, in which FIGURE 1 is a transverse vertical section through one form of the machine taken on the line 1—1 of FIG. 4 of the drawings, looking in the direction of the arrows;

FIGURE 2 is a side elevational view of the machine as shown in FIGURE 1 of the drawings, the view being represented by the line 2—2 of FIGURE 1 of the drawings, and looking in the direction of the arrows;

FIG. 5 is a horizontal section illustrating the base and basket in top plan, the section being taken on the line 5—5 of FIG. 1, and looking in the direction of the arrows;

FIG. 6 is a front elevational view of a preferred modification of the machine illustrated in FIG. 1, certain parts being broken away and in section to illustrate details;

FIGURE 7 is a fragmentary transverse sectional view showing a preferred form of one of the supporting and guide legs, the section being represented by the line 7—7 in FIG. 6 of the drawings, looking in the direction of the arrows, and FIGURE 8 is a horizontal section taken through the leg on the line 8—8 of FIG. 7 of the drawings.

Figure 3:
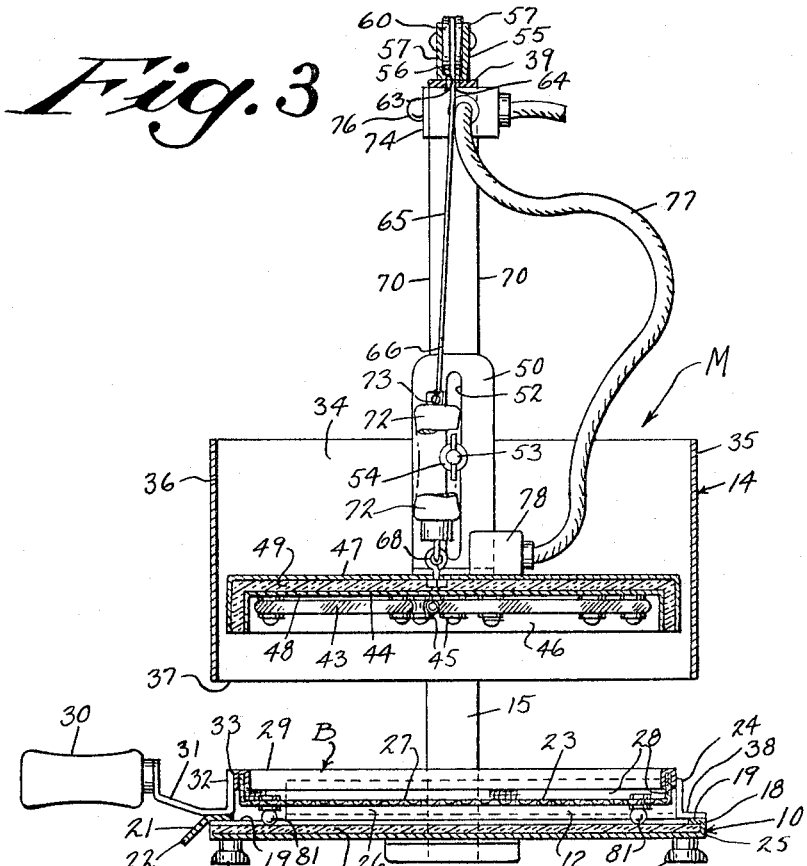
FIG. 3 is a longitudinal vertical section through the machine, the section taken on the line 3—3 of FIG. 1 of the drawings, looking in the direction of the arrows and showing further details of construction.
Figure 4:
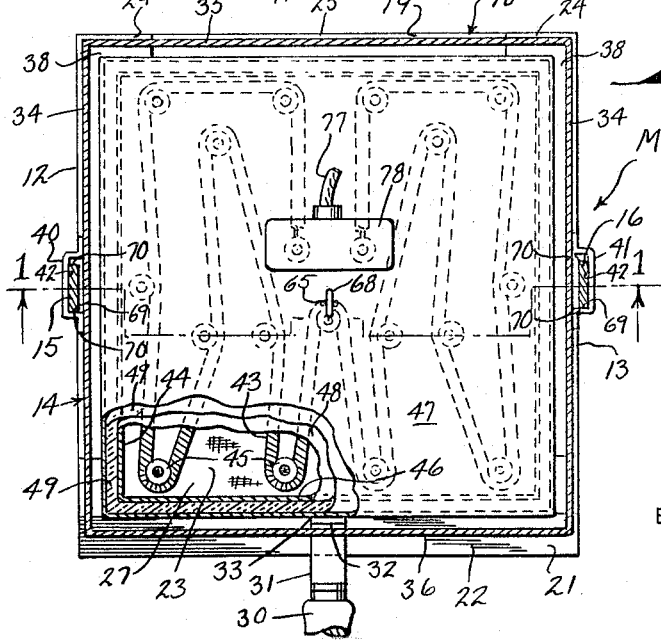
FIG. 4 is a horizontal section taken on the line 4—4 of FIG. 1 of the drawings and looking in the direction of the arrows, with certain other parts being broken away and in section to illustrate further details.

Referring now to the drawings in detail, wherein similar reference characters designate corresponding parts throughout the several views, the letter M generally indicates one type of my improved machine for heat shrinking material about the articles A held in the basket B. The machine M includes broadly, a substantially rectangular shaped base 10 having supporting legs 11 and side wall 12 and 13; a vertically sliding cage 14, guide rails 15 and 16 and counterweights 17. The base 10 may be formed from any desired material but preferably is constructed from a sheet of metal in which the side and rear walls 18 are turned inwardly, as at 19, and overlie a sheet of insulating material 20. The front end of the base has secured thereto a guide member 21 which is provided with a downwardly and forwardly extending lip 22, the purpose of which will become readily apparent as the description proceeds. The base also carries the forementioned side walls 12 and 13, and it is obvious that the walls could extend entirely around the base, but these walls are primarily designed to receive and seat the basket 23, and therefore, it is only necessary to form the walls as angle pieces shown clearly in FIGURES 1, 3 and 5 of the drawings, and each side wall has an extension 24 at the rear 25 of the base. The basket 23 is of a size and configuration to be snugly received between the upstanding portions 26 of the side walls 12 and 13. This basket includes a wire body 27, the sides of which extend upwardly, as at 28, and are reinforced at their upper edges by an inverted U-shaped reinforcing strip 29. Secured to the strip 29 at the forward portion thereof is a handle 30 and it is to be noted that the handle is secured to the strip 29 by an intermediate U-shaped piece of metal 31, the inner leg 32 of which is welded or otherwise joined at the point 33 to the reinforcing strip 29. The reason for the shape of this intermediate strip of material is readily apparent by observing the dotted line position of the cage 14 in FIGURE 1 of the drawings. This is due to the fact that the cage 14 is constructed as an open ended rectangular shaped member having side walls 34, rear wall 35 and front wall 36, and the lower edges 37 of the walls seat upon the horizontally extending portion 38 of the angle shaped base side walls 12 and 13. Thus, the piece 31 must be so constructed as to allow the cage 14 to seat and confine and direct the heat to the basket and articles held thereon.

Secured to each side of the base is the pair of spaced vertically extending side rails or guides 15 and 16, and these guides are joined at the upper ends thereof by a cross-bar 39, and it should be noted that the cage 14 is adapted to slide vertically within the rails 15 and 16. For this purpose, on each of the side walls 34 of the cage 14, I provide a pair of straps 40 and 41, respectively, and these straps are positioned one above the other in parallel relation and include a space 42 of a size and configuration to receive the respective portions of the rails 15 and 16. Adjustably carried within the cage 14 are heating elements 43 and these elements are held within an inverted pan 44 by means of the insulated pegs 45. It should be noted that the inner side edges 46 of the inverted pan 44 extend downwardly beyond the end terminations of the insulating pegs 45 and the pan 44 is actually formed of the inner and outer metal pieces 47 and 48 between which is secured the insulating material 49. The upper surface of the pan 44 has secured thereto a pair of spaced vertically extending supporting legs 50 and 51 respectively, and each leg includes an elongated centrally disposed vertically extending slot 52, through which the threaded portion of bolts 53 extend, and these bolts are firmly secured to the upper end of the side walls of the cage 14. The threaded portions are designed to receive the wings nuts 54 and therefore, it can be seen that the wing nuts when loosened will allow the pan 44, carrying the heat elements 43 to be adjusted vertically in relation to the cage 14 and by tightening the wing nuts 54 the elements will be held securely in their adjusted position.

An important feature of my present invention resides in the manner in which the cage and heating elements are slidably supported in relation to the base and basket B. To accomplish this I provide a cross-beam 55 which is firmly secured to the cross-bar 39 and centered in relation thereto. This cross-beam 55 is preferably U-shaped in cross-section to provide the bottom wall 56 and the parallel vertically extending side walls 57. The cross-beam 55 is of such a length that its ends 58 terminate well beyond the side rails 15 and 16. Rotatably supported in the cross-beam 55 are a series of pulleys 59, 60, 61 and 62, respectively. Pulleys 59 and 62 are secured adjacent the ends 58 of the cross-beam so that their outer peripheries extend beyond the end terminations of the respective ends 58. The bottom wall 56 at its axial center is provided with an opening or slot 63 which is in alignment with a corresponding slot 64 formed in the cross-bar 39. Slot 63 and slot 64 are so arranged as to be above the axial center of the cage 14 and the adjustable pan 44. A pair of cables 65 and 66 are trained over pulleys 59 and 60 and 61 and 62, respectively, and the outer ends of the cables have secured thereto by a loop and ring arrangement 67, the weights 17. The inner ends of the cables are secured to a supporting ring 68, which is firmly secured at the transverse center of the inverted pan 44 but (note FIG. 3) is located just off the longitudinal center. Obviously, the ring 68 could be secured at either the forward or rearward part of the longitudinal center of the inverted pan 44, but for the purpose of illustration, it is shown situated in front of the longitudinal center and thus when the cage is supported by the cables and weights it will tilt as shown more clearly in FIGURE 2 of the drawings, so that the respective edges 69 of the straps 40 and 41 will be in frictional engagement with the respective sides 70 of the guide rails 15 and 16. Thus, inasmuch as the combined weight of the two weights 17 is substantially equal to the weight of the cage and the heating elements held therein, this frictional engagement is sufficient to hold the cage in any vertical adjustment in relation to the side rails 15 and 16. To facilitate the easy manipulation of the cage the cable 65 and 66 extend through a central bore 71 formed in the operating handle 72. The handle may be affixed in relation to the cables by any desired means but as shown, a set screw 73 is provided to lock the handles to the cables. Electrical power is provided through the box 74 and the same includes a conventional toggle switch 75 and a signal or indicator light 76, which is placed in the circuit when the switch is turned on to indicate that heat and electrical current is being supplied to the heating elements through the line 77 and box 78. Also secured to the cross-bar 39 is a mechanical timer 79 and this timer is also of a conventional type wherein the knob and pointer 80 may be set to any particular indication in seconds and will within the time limit move back to zero and produce a sound indicating that the desired time has elapsed.

In utilizing my novel machine, it should be noted that the articles about which the material is to be shrunk are usually small and difficult to work upon. Further, the various elements are delicate and sensitive and are primarily used in electronic and electrical circuits of space craft. Therefore, the articles are first shaped by placing the material in the desired location about the article and the articles are placed in the basket B. The basket is then moved into the position shown in the full lines of the drawings and to facilitate the ease of setting of the basket to the base, I provide small rounded knobs or legs 81 and these cooperate with the slanted lip 22 of element 21 to guide the basket quickly in its proper position. The degrees of heat emitted by the heating element are known and the length of time required for the heat to be applied is also ascertained and will vary according to the material used. We will assume that the length of time needed to properly shrink the material about the articles is ten seconds. With the basket in place, the cage is lowered by a simple light downward pressure on the handle 72, or merely by lifting one of the weights 17 until the cage is in its dotted line position, shown in FIGURE 1. If none of the articles protrude above the top surface of the reinforcing strip 29 of the basket, the wing nuts 54 are loosened and the heating element is lowered until the respective surfaces 81 of the pan and surface 82 of the reinforcing strip are in engagement. In this event, the heating elements are recessed within the walls of the inverted pan 44 sufficiently to prevent contact with the articles being treated. The timer is then set to number 10, indicating ten seconds, and when it revolves back to zero, the cage is quickly lifted and the basket removed, and again it is stressed that the amount of heat and the element of time are important so that the other sensitive elements of the articles being treated will not be damaged.

In some instances, and particularly where different types of articles may be treated at the same time, providing the same material is utilized, they may vary in height and some of the articles may protrude above the upper surface 82 of the reinforcing strip 29. It is thus conceivable that some of the articles may contact directly the heating elements, which obviously will damage, burn or mark the material. To prevent this, a simple spacing device (not shown) in the shape of a rectangular piece of material of a size and configuration to fit within the inner dimensions of the basket B can be placed on top of the articles and the heating element then adjusted until it rests upon this rectangular piece. Inasmuch as the heating elements are spaced some distance from the end terminations of the insulated pegs 45, it will be readily apparent that when the piece is removed the articles cannot and will not contact the heating elements per se.

However, in the preferred modified form of my invention illustrated in FIGURES 6 to 8, inclusive, and which will be described in detail, I provide one or both of the legs 50, 51 with calibrations 83 for this purpose. In FIGURE 7 for example, I show the calibrations or indicia 83 as being correlated with the upper edge 84 of the side wall 34 of the cage 14 in such a manner that the distance between the heating elements and bottom of the basket B will be indicated by reading the indicia in alignment with the edge 84. Thus, it is only necessary when articles of various height are placed within the basket to measure the distance from the bottom of the basket to the top of the highest article and then adjust the legs 50, 51 until this measurement is indicated in alignment with the upper edge 84. This obviously will eliminate the necessity of utilizing the rectangular piece above described.

As above mentioned, I have illustrated in FIGURES 6 to 8 inclusive a preferred, refined form of the machine M, shown in FIGURES 1 to 5 of the drawings. Therefore, machine M' (FIGS. 6 to 8) is substantially identical in the over-all major construction to machine M and the same includes base 10, basket B, cage 14, the inverted pan 44, guide rails 15 and 16, cross-bar 39, cross-beam 55, weights 17 and cables 65 and 66, all of which are identical in structure to that shown and described in relation to the machine M. It has been found that where the machine is continuously used, heat builds up rapidly within the confined space 85 and therefore, to maintain the desired temperature and to alleviate accidental burning, should the time limit be exceeded, and in particular to eliminate damage to the machine per se, I provide a novel stop adjusting means 86 which can be utilized to space the lower edges 37 of the cage walls from the space 38 of the base 10 to allow the heat to escape as indicated by the arrows, FIG. 6. This means includes an elongated vertically extending rod 87 anchored to the pan 44 by means of the nut 87'. This rod extends through an axial bore 88 formed in the handle 72' and it should be noted at this point that both the rod 87 and handle 72' are positioned off center identically to the position of handle 72 in machine M, so that the proper tilt will be given to the cage 14. Cross-bar 39 and cross-beam 55 are provided with the centrally positioned slots 63 and 64 and rod 87 extends upwardly therethrough, and then terminates well beyond the upper edges of the cross-beam 55. This rod 87 is provided with threads and an adjusting stop member 89 is threadedly received on the upper end of the rod. Between the stop member 89 and upper surface 90 of the cross-beam 55, I provide a stop washer 91 through which the rod 87 is freely movable. In this form of the invention, I provide the pulleys 59, 60, 61 and 62, but pulleys 60, 61 are spaced a greater distance apart then in machine M and the cables 65 and 66 are trained over the pulleys but extend through aligned apertures 92 and 93 respectively, formed in the cross-bar 39 and beam 55. The cable ends are firmly secured to the handle 72' by means of the washer 94 and nut 95. Actually, it might be noted that in both machines, cables 65 and 66 actually are continuous in length and secured at their central portions as described.

From the above, it is readily apparent that the stop member 89 is threadedly carried by the rod 87 and can be moved to any position along the rod such as illustrated in its full line position and dotted line position of FIG. 6. When the stop 89 is so adjusted it will regulate the space between the walls of the cage and the bottom surface 38 of the base and act as a stop for the lower limit of the cage 14.

To further stabilize the device, I provide a pair of guide fingers 96 for each of the supporting legs 50 and 51, and these fingers, note in particular FIGS. 7 and 8, may be struck out from the respective legs and extended horizontally to engage the side edges of the respective side rails 15 and 16. These guide fingers 96 will maintain the pan 44 and heating elements held therein in a substantially horizontal position and by loosening the wing nuts 54, it is obvious that the cage 14 will tilt as previously described, since the same is held in pivotal relation with the pan 44 by means of the bolts 53. Thus, by tightening the wing nuts 54, pan 44 will be held in a horizontal position and cage 14 will be held in its tilted position. It is also important to note that I provide a pair of upwardly and outwardly extending brace bars 97 on each side of the machine and each bar is secured at its lower end termination to a respective guide rail 15 and 16. The upper end 98 of each bar is secured to the respective outer end of the cross-beam 55, thus bracing the beam and giving an over-all firm structure.

From the foregoing, it should be readily apparent that I have provided a heat shrinking machine that can be used by unskilled labor and in which the articles can easily and quickly be associated with the machine and removed therefrom, and wherein the heat can be brought in position directly above the articles and quickly moved away from the articles.

While I have shown and described certain specific embodiments of my invention, it will be understood that these embodiments are merely for the purpose of illustration and that various other forms may be devised and that changes may be made in proportions and minor details of construction without departing from the spirit of the invention or scope of the appended claims.

What I claim as new is:

1. A heat shrinking apparatus for shrinking materials about the articles to be treated comprising, a substantially flat rectangularly shaped base, a removable article holding tray of a size and configuration to fit on said base, a cage carried by said base vertically adjustable to a lower operative position and an upper inoperative position, said cage including vertically extending front, rear and side walls of a size and configuration in its closed operative position to completely surround said tray and to rest on said base adjacent the peripheral edges thereof, a substantially horizontally disposed pan forming a partition within said walls of said cage, means for adjustably securing said pan within said walls for varying the height of the pan in relation to the lower end termination of said walls, heating elements carried by said pan, means connecting said heating elements to a source of electrical current, means for facilitating the moving of said cage to its closed operative position over said tray and base and to its open inoperative position away from said tray and base including a pair of spaced vertically extending side rails carried by said base, a cross-beam connecting the upper end terminations of said side rails, a handle and cables secured to the upper surface of the pan, pulleys carried by said cross-beam and extending beyond the outer surface of the respective side rails, said cables being trained over said pulleys, counterweights on the end termination of each cable, the combined weight of the cage and pan being substantially the same as the combined weight of the counterweights, and said handle and cables being secured to said pan at the transverse center thereof but offset from the longitudinal center thereof.

2. A heat shrinking apparatus for shrinking materials about articles to be treated comprising, a substantially flat rectangularly shaped base having front, rear and side walls, a removable article holding tray of a size and configuration to fit on said base, means for guiding and setting the tray in proper position on said base, a pair of spaced vertically extending parallel side rails each secured at its lower end to a respective side of said base and having its upper end termination well above said base, a cage carried by the side rails for vertical sliding engagement therewith, said cage having vertically extending front, rear and side walls of a size and configuration to completely surround said tray and base and to rest on said base adjacent the peripheral edges thereof, a substantially horizontally disposed pan forming a partition within said cage walls, means for adjustably securing said pan within said walls for varying the vertical height of the pan in relation to the lower end terminations of said walls, heating elements carried by said pan adjacent the lower surface thereof, means connecting said heating elements to a source of electrical current, means secured to each cage side wall engaging a respective side rail, a cross-beam joining the upper end terminations of said side rails, means for facilitating the vertical sliding movement of said cage to its closed operative position over said tray and base and to a number of open inoperative positions above said tray and base, a handle and cables secured to the upper surface of the pan, pulleys carried by said cross-beam and extending beyond the outer surface of the respective side rails, said cables being trained over the pulleys, counterweights on the end terminations of said cables, the combined weight of the cage and pan being substantially the same as the combined weight of the counterweights, and said handle and cables being secured to said pan at the transverse center thereof but offset from the longitudinal center thereof.

3. An appartus as set forth in claim 2 wherein said means secured to each cage side wall engaging a respective side rail includes a pair of spaced longitudinally extending straps arranged one above the other and each having an opening surrounding a respective side rail and each opening being of a greater longitudinal length than the longitudinal width of the respective side rail.

4. An apparatus as set forth in claim 1, wherein said means for adjustably securing said pan within said walls includes a pair of spaced vertically extending legs secured to the upper surface of said pan adjacent a respective side wall of said cage, said leg having an elongated vertically extending slot formed therein, a threaded bolt secured to each cage side wall extending inwardly through a respective slot, and a wing nut for each bolt.

5. An apparatus as set forth in claim 2, wherein the means for guiding and seating the tray in proper position on said base includes a transversely extending front lip for said base, said lip depending downwardly at an angle, a handle secured to one side edge of said tray, and a series of depending spherical supporting legs on the bottom wall of said tray.

6. An apparatus as set forth in claim 4, wherein the vertically extending leg is provided with calibrations adapted to be aligned with the upper edge of said cage and to indicate the distance between the bottom of the basket and the heating elements.

References Cited by the Examiner
UNITED STATES PATENTS

| | | | |
|---|---|---|---|
| 2,263,866 | 11/1941 | Barber | 219—354 |
| 2,651,702 | 9/1953 | Burke et al. | 219—348 |

ANTHONY BARTIS, *Acting Primary Examiner.*

RICHARD M. WOOD, *Examiner.*

C. L. ALBRITTON, *Assistant Examiner.*